United States Patent
Goodman et al.

[11] Patent Number: 5,850,202
[45] Date of Patent: Dec. 15, 1998

[54] METHOD FOR IMPROVING SAR SYSTEM SENSITIVITY IN THE PRESENCE OF RF INTERFERENCE

[75] Inventors: Ron S. Goodman, Novi, Mich.; Ronald A. Schneider, San Diego, Calif.

[73] Assignee: Erim International, Inc., Ann Arbor, Mich.

[21] Appl. No.: 902,422

[22] Filed: Jul. 29, 1997

[51] Int. Cl.⁶ .................................................. G01S 13/90
[52] U.S. Cl. ............................................. 342/25; 342/196
[58] Field of Search .............................. 342/25, 196, 159, 342/162

[56] References Cited

U.S. PATENT DOCUMENTS

| | | | |
|---|---|---|---|
| 4,398,195 | 8/1983 | Dano | 342/46 |
| 4,768,156 | 8/1988 | Whitehouse et al. | 364/521 |
| 4,780,718 | 10/1988 | Hudson et al. | 342/25 |
| 4,999,635 | 3/1991 | Niho | 342/25 |
| 5,125,008 | 6/1992 | Trawick et al. | 375/102 |
| 5,248,976 | 9/1993 | Niho et al. | 342/25 |
| 5,329,283 | 7/1994 | Smith | 342/25 |
| 5,424,743 | 6/1995 | Ghiglia et al. | 342/25 |
| 5,570,691 | 11/1996 | Wright et al. | 128/661.01 |
| 5,572,448 | 11/1996 | Judell | 364/563 |
| 5,579,011 | 11/1996 | Smrek | 342/113 |
| 5,630,154 | 5/1997 | Bolstad et al. | 395/800 |
| 5,708,436 | 1/1998 | Loiz et al. | 342/25 |

*Primary Examiner*—John B. Sotomayor
*Attorney, Agent, or Firm*—Gifford, Krass, Groh, Sprinkle, Patmore, Anderson & Citkowski

[57] ABSTRACT

The sensitivity of a synthetic aperture radar (SAR) system employing stretch processing is improved in the presence of radio-frequency interference (RFI). The sequence of data processing operations initially uses a high number of bits to digitize radar echoes plus RFI, then uses floating-point arithmetic to perform range deskewing to "compress" RFI tones, followed by thresholding and nulling the primary RFI contributors, and finally re-quantizes the resulting radar signal to a lower number of bits and appropriately allocating these bits over the range of signal levels.

6 Claims, 1 Drawing Sheet

METHOD FOR IMPROVING SAR SYSTEM SENSITIVITY IN THE PRESENCE OF RF INTERFERENCE

FIELD OF THE INVENTION

This invention relates generally to radar systems and, in particular, concerns a method which improves the sensitivity of synthetic aperture radar (SAR) systems in the presence of dominant radio frequency interference (RFI).

BACKGROUND OF THE INVENTION

In low-frequency SAR systems, including ultra-wideband (UWB) systems operating in the very high-frequency (VHF) or ultra-high frequency (UHF) bands of the electromagnetic spectrum, sensitivity is often limited by RFI in the form of strong signals broadcast by television stations or numerous other commercial or military transmission sources.

It is common practice in high-resolution SAR systems to utilize a linear frequency modulation (FM), or chirp, transmission waveform, and to mix received radar echoes with a delayed replica of the transmitted signal in a procedure known as dechirp-on-receive, stretch processing, or deramp-processing. This mixing procedure performs a useful initial signal processing operation on the radar echoes, but has the adverse effect of dispersing narrowband RFI across the entire intermediate frequency (IF) bandwidth of the SAR system receiver. As this dispersed RFI energy tends to occupy substantial regions of the received SAR data interval, the desired SAR signal within these intervals would be irrecoverably lost if the dispersed RFI were allowed to saturate the system analog-to-digital (A/D) converter(s). To prevent saturation, the receiver gain must be adjusted using variable attenuators. The applied attenuation suppresses both the RFI and the desired radar echoes, thereby decreasing signal-to-quantization-noise ratio and degrading overall system sensitivity.

Two conventional methods for improving SAR system sensitivity in the presence of dominant RFI are to increase the power of the transmitted radar signals, and to increase the number of system A/D converter bits. Increasing the power of transmitted radar signals suffers from a number of well-known disadvantages, including increased system cost, increased transmitter weight and volume, increased wear on system components, and increased probability of enemy intercept in a tactical environment. Increasing the number of A/D converter bits can carry severe penalties in terms of an increased data rate and increased data volume for buffering, recording, or datalinking.

SUMMARY OF THE INVENTION

This invention overcomes RFI-induced sensitivity degradation by performing initial signal digitization using a relatively high number of A/D converter bits. The procedure converts the digitized radar echoes, plus RFI, into a floating-point data representation, and performs a well-known SAR processing operation referred to as range deskew, which cancels the dispersion induced by the analog dechirp-on-receive operation and effectively compresses the RFI energy into narrow spectral bands. The procedure performs thresh-holding and nulling of the compressed RFI, then re-quantizes the resultant radar signal to a lower number of bits per digital sample and appropriately allocates these bits over the range of signal levels. The number of bits that the procedure retains after re-quantization is consistent with the number of bits needed to satisfy system requirements in the absence of RFI.

Broadly and in general terms, upon digitization of a received SAR signal utilizing $b_1$ bits per sample, range deskewing, threshholding and nulling of the signal are carried out using floating-point arithmetic, after which the signal is re-quantized using a number of bits per sample which is less than $b_1$. The threshold nulling operation may use a constant or a dynamic threshold setting.

In more specific terms, an analog-to-digital conversion is performed on a dechirped analog SAR signal utilizing $b_1$ bits per sample. The samples are then converted into floating point data suitable to the range deskewing. Those floating point data samples exceeding predetermined threshold value are considered to be RFI and are nulled by replacing the samples with zeroes. After threshholding and nulling, the signal data is requantized utilizing a reduced number of bits per sample. The step of range deskewing the floating point data typically further includes the steps of performing a fast Fourier transform (FFT), multiplying the result of the FFT on a sample-by-sample basis using a pre-computed and pre-stored deskew vector, and performing an inverse FFT.

The method is capable of mitigating the RFI-induced sensitivity degradation without increasing transmitter power or increasing data storage/transmission requirements. A beneficial side-effect is that the range deskew operation improves the time-frequency characteristics of the received pulses, which allows the system to realize a net reduction in data storage and/or bandwidth requirements.

DETAILED DESCRIPTION OF THE INVENTION

Figure 1:
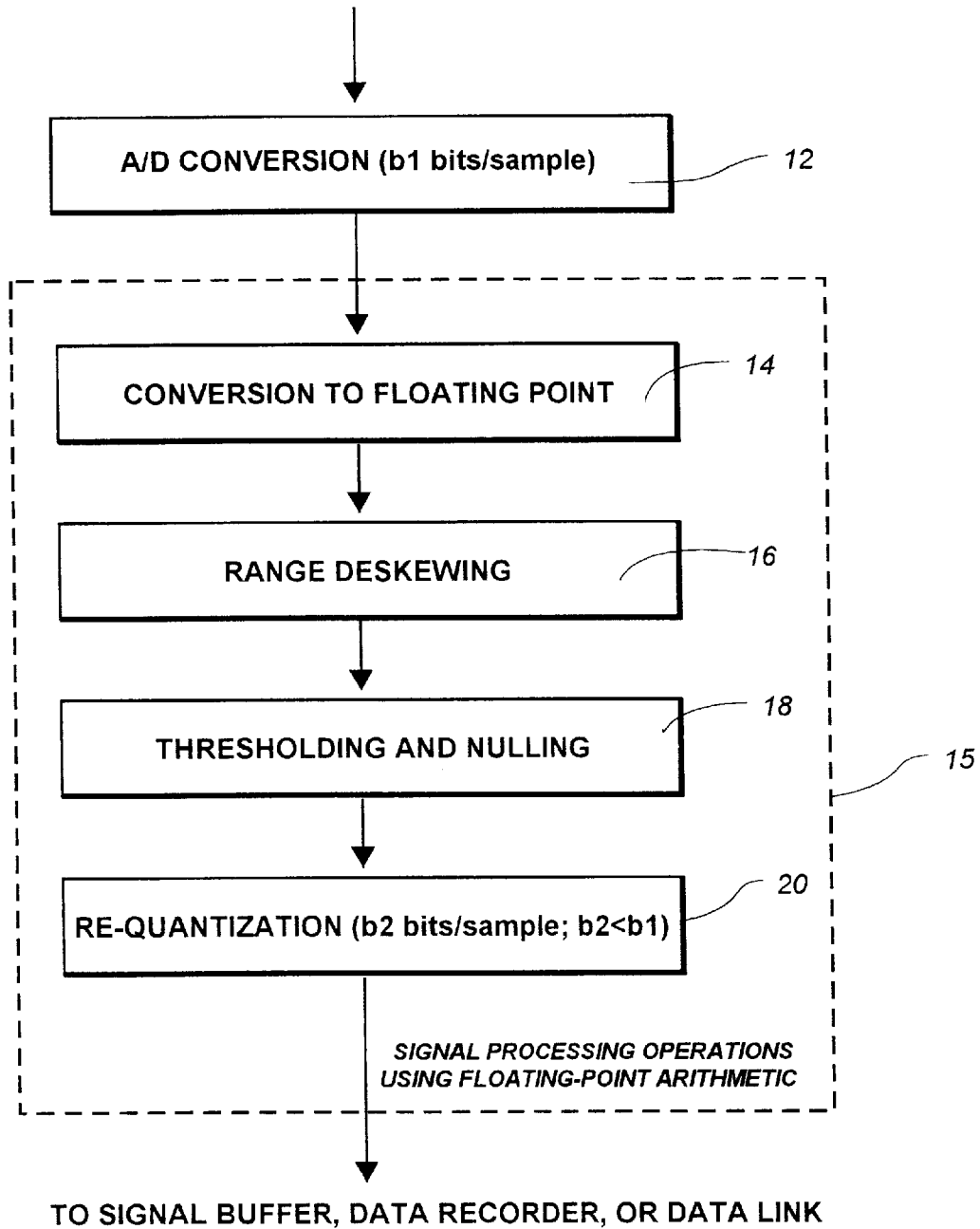
FIG. 1 is a block diagram depicting major functional operations according to the invention.

Making reference to FIG. 1, the method of this invention includes the following procedural steps. At block 12, an initial A/D conversion is performed, if required, using a relatively large number of bits per sample. The digitized signal samples are converted into floating-point data at block 14. All processing operations within the dashed box 15 are subsequently carried out using floating-point arithmetic. Typically, the method would preferably implement these operations on a single-board computer capable of performing the complex computations in real time.

A range deskew is performed at block 16, which is typically implemented as a forward fast Fourier transform (FFT), sample-by-sample multiplication by a pre-computed and pre-stored deskew vector, and an inverse FFT to complete the process. RFI signal samples are then nulled at block 18 after comparison with a selected threshold value. The threshold comparator may be constant or may change dynamically.

Next, at block 20, a re-quantization of the resulting floating point data is performed to a lower number of bits per sample. The method may employ uniform quantization or more complex quantization schemes.

The method offers numerous advantages as compared to alternate techniques. For one, sensitivity improvement is equivalent to increasing the number of A/D converter bits. Addition of vector quantization techniques can provide even further sensitivity improvement. The invention permits increased swath width, finer resolution, or decreased datalink bandwidth. The method further offers a decrease in image formation processing computations, and it is an all-digital process; as such, there are no temperature drift effects or unknown delays.

The method is site-independent, requiring no a priori information regarding the RFI source(s). Implementation of the method is less costly than increasing transmit power, and is more datalink bandwidth efficient than simply increasing the number of system A/D converter bits.

That claimed is:

1. A method of improving the sensitivity of a synthetic aperture radar (SAR) system, comprising the steps of:

receiving a digital SAR signal exhibiting b1 bits per sample;

range deskewing and threshold nulling the signal using floating-point arithmetic; and re-quantizing the signal using a number of bits per sample which is less than b1.

2. The method of claim 1, wherein the threshold nulling is constant.

3. The method of claim 1, wherein the threshold nulling is dynamic.

4. In a synthetic aperture radar (SAR) system, the method of improving sensitivity in the presence of radio-frequency interference, comprising the steps of:

receiving a dechirped analog SAR signal performing an analog-to-digital conversion of the dechirped analog SAR signal utilizing $b_1$ bits per sample to yield a plurality of digitized signal samples;

converting the digitized signal samples into floating point data;

range deskewing the floating point data;

nulling the floating point data on a per-sample basis using an intensity value greater than a threshold value; and re-quantizing the result of the above steps utilizing a number of bits per sample which is lower than $b_1$.

5. The method of claim 4, wherein, in the step of nulling the floating point data on a per-sample basis, the threshold value is a constant.

6. The method of claim 4, wherein, in the step of nulling the floating point data on a per-sample basis, the threshold value is a variable.

* * * * *